United States Patent Office 3,438,599
Patented Apr. 15, 1969

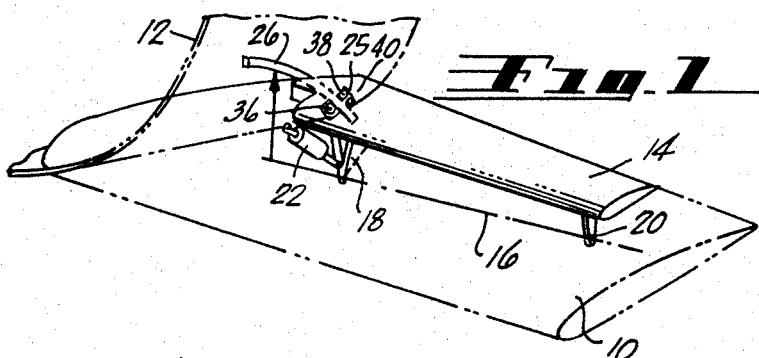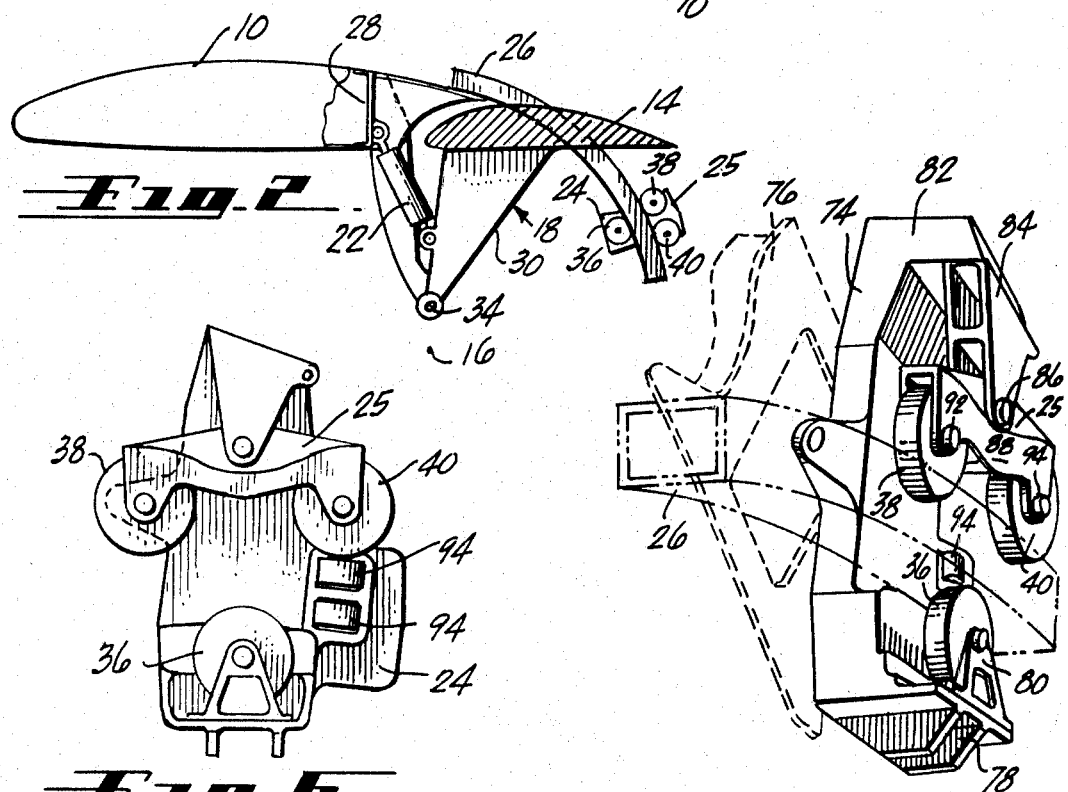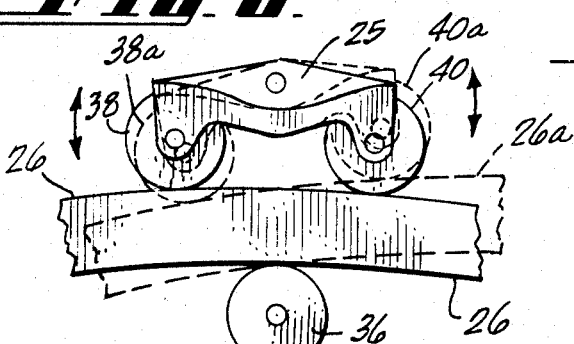

3,438,599
FLAP TRACK ROLLER SUPPORT
Joseph A. Welzen, Los Alamitos, Calif., assignor to McDonnell Douglas Corporation, a corporation of Maryland
Filed Oct. 12, 1967, Ser. No. 674,855
Int. Cl. B64c 3/50, 9/32; E05d 13/02
U.S. Cl. 244—42                                9 Claims

ABSTRACT OF THE DISCLOSURE

A pivoting roller assembly for retaining the track of an aircraft flap subjected to twist and other loads.

Background of the invention

The aviation industry is continually trying to get heavier airplanes into the air at lower speeds while using existing runways. The aerodynamic design of the aircraft wings for high speed flight does not provide the necessary lift for this purpose. One of the obvious ways of handling this problem has been with the use of high lift devices, such as flaps which are, in effect, extensions of the wing. Flaps may be used for obtaining the much-desired lift during takeoff and in landing, yet may be retracted when the aircraft is airborne. This invention relates to structure for extending and retracting the flap. Typically, in the past, a track is mounted on the flap and this track rides between rollers on the fuselage to permit the extension and retraction of the flap. Because of a great saving in weight, hinges are used instead of a plurality of tracks and rollers in guiding the movement of the flap from its retracted position to its extended position. However, to get the flap to its optimum extended position, the hinge line, of necessity, is below the lower surface of the wing. This requires that hinge brackets extend out into the airstream below the lower surface. This, naturally, creates drag and air turbulence so that the extension of the hinge line below the lower surface of the wing should be kept to a minimum. The inboard bracket would extend below the surface on the order of about 30 inches, which is an undesirable feature because of the drag and air turbulence created. At this point it is preferable to have a carriage flap track system and thus eliminate the innermost inboard hinge bracket. Consequently, modern flap assembly structures are supported in the wing by a combination of a plurality of hinges and the inboard track assembly. The track assembly may be mounted within the fuselage and the undesirable drag eliminated. The track is mounted on the flap and rides on rollers on the fuselage.

In the installation of the flap track and roller assembly, it has been customary to use two rollers engaging the top surface of the track and two rollers to engage the bottom surface of the track. The track is curved and the rollers are so positioned as to permit the flap to pivot along the hinge line below the wing surface. It has been found with the four roller arrangement, that the flap, when subjected to twist and other loads, would create unusually high loads on the upper rear roller and the forward lower roller, requiring a large and heavy structure. This structure additionally required heavier supporting structure on the fuselage to carry these loads.

Summary of the invention

In accordance with the present invention, a roller carriage assembly has been developed in which the unusually high forces due to twisting, as well as the lift and drag forces, are spread out over the entire flap structure instead of being concentrated along the rollers and their support mechanism. This results in a saving of weight in the roller support structure and the reinforcement structure in the fuselage, as well as a reduction in the complexitiy of the structure itself and its maintenance and cost. In one form of the present invention, a carriage support assembly has a single roller mounted thereon which engages the lower surface of the flap track and at the top of the bracket, a pair of pivotally mounted rollers are affixed. Thus, instead of using a rigid roller system which absorbs the twisting forces of the track, the flexible roller system of the present invention is used, permitting the track to twist and thus distribute the twisting forces over the entire flap. These twisting forces, then, are absorbed by the hinges of the flap.

It is therefore an object of this invention to provide for an improved flap track and carriage support.

Another object is the provision of an improved carriage support for a flap track that does not rigidly oppose the twisting forces to which the track is subjected.

Another object is the provision of a flap track carriage which permits the twisting forces to be distributed over the flap and absorbed by the hinges which support the flap.

Another object is the provision of a carriage support for a flap track having a minimum of weight, moving parts, maintainance problems and complexity.

Description of drawings

A more complete understanding will be had of this invention when reference is made to the drawings wherein:

FIGURE 1 is a pictorial illustration showing the relationship of the flap to the aircraft fuselage and wing;

FIG. 2 is a diagrammatic illustration showing in side view the flap and its supporting structure in its retracted position;

FIG. 5 is a side view illustrating the pivot motion of the track and the reaction thereto of the pivotal roller support structure of the present invention; and FIG. 6 is a side view and FIG. 7 is a perspective view of one form of structure utilizing the present invention.

Figure 3:
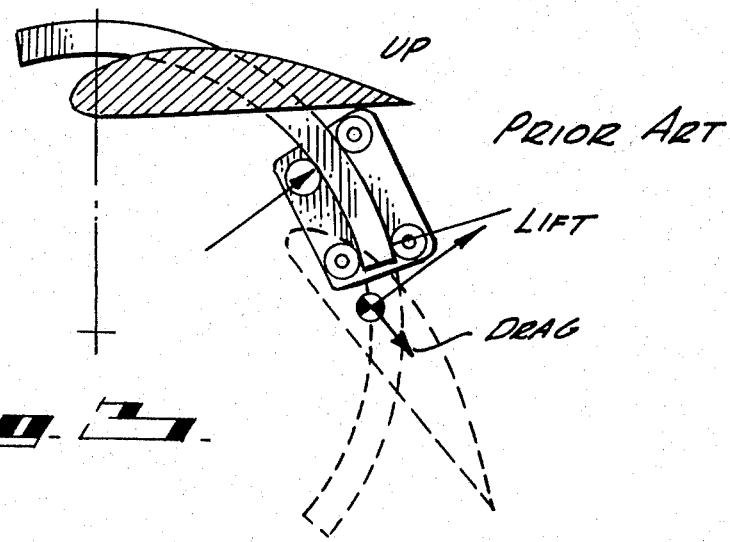
FIG. 3 is a diagrammatic illustration of a carriage support structure in the prior art with the forces applied thereto.

Reference is now made to FIG. 1. Here there is shown in broken lines a wing 10 connected to an aircraft fuselage 12. Rearwardly of the wing and adjacent the fuselage is a flap 14 pivotally connected to the wing along a hinge line 16. This hinge line 16 extends below the surface of the wing as can be seen in FIG. 2. A plurality of hinges 18, 20 which pivot at the hinge line 16 interconnect the flap 14 with the wing 10. Because of the configuration of the wing and the configuration of the flap, the hinge line 16 does not follow the plane of the wing chord and the legs of hinge 18 are longer than the legs of hinge 20. The rearward movement of the flap follows a conical instead of a cylindrical surface. An actuator 22 moves the flap from its retracted to its extended position and vice versa. Mounted in the fairing of the fuselage 12 is a carriage support assembly 24 on which is supported flap track 26 that is mounted on the flap 14. As can be seen in FIG. 2, the actuator 22, which may be a hydraulic cylinder for example, is mounted between the rear spar 28 of wing 10 and the rear leg 30 of hinge 18. The forward leg 32 is also affixed to the rear spar 28. Mounted to the rear leg 30 of hinge 18 is the flap 14 and its flap track 26. Track 26 has a constant radius with its origin on hinge line 16. Because the flap rotates in a conical surface, the track radius is not the same radius as legs 30 and 32 of hinge 18, although the pivot point 34 of this hinge does lie on the hinge line. Carriage 24 is mounted on the fuselage in such manner that roller 36 engages the bottom surface of the track and rollers 38 and 40 engage the top surface of the track. As can be seen, carriage 24 is mounted near the rear end of track 26 when flap 14 is in its retracted position, as shown.

In order to more distinctly describe and define the present invention over the prior art, reference is now made to FIG. 3 which shows a prior art flap, track, and carriage structure in retracted and extended position. Here there is shown a flap 42 having a track 44 affixed thereto, carriage 46 has two upper rollers 48, 50, and two lower rollers 52, 54 affixed thereto for engagement of the track 44 therebetween. When flap 42 is in its extended position shown by broken line 42A, the track 44 passes through the rollers rearwardly and downwardly to its position shown by broken line 44A. When in this position, the forward movement of the aircraft imposes lift and drag forces at the center of pressure 56, as shown by the arrows 58, 60. In addition to the lift and drag forces thus imposed, a twisting force is applied since this track is inboard of the nearest pivotal hinge interconnecting the flap and wing. These total forces result in reaction forces on rollers 50 and 52, as shown by arrows 62 and 64. In one example, a force of 18,000 pounds was applied by roller 50 against the upper surface of track 44 and a force of 12,000 pounds was applied by roller 52 against the undersurface of track 44 to oppose the resultant forces that were applied by the flap.

Figure 4:
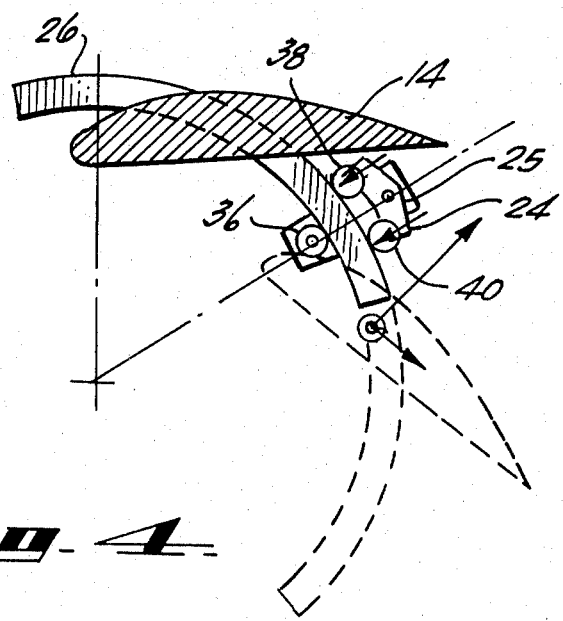
FIG. 4 is a diagrammatic illustration of the carriage support structure of the present invention with the resulting forces applied.

Reference is now made to the present invention as illustrated in FIG. 4. Here is shown flap 14 to which track 26 is attached for passage between rollers 38, 40 on pivoting roller support 25, and roller 36 on carriage support assembly 24. In its extended position, the flap is shown in broken lines 14A and the track by broken lines 26A. The lift and drag forces are shown at the center of pressure 66 by arrows 68 and 70. The forces applied by rollers 38 and 40 to resist the resultant force is shown by arrows 70 and 72. It has been found under the same environmental conditions as the prior art structure in FIG. 3 that these forces amounted to approximately 2,500 pounds each or a total of 5,000 pounds. It should become at once apparent that the strength of the carriage support assembly and the supporting structure in the aircraft fuselage should be much less in supporting a 5,000 pound load, as in the present invention, when compared to the load induced by the prior art device shown in FIG. 3. The rest of the force, predominantly a twisting force, is transmitted along the flap to the other hinge points where they are absorbed by the hinges without any difficulty.

FIG. 5 illustrates the affect of the twisting force applied to the track and the pivoting roller support portion of the carriage. Here track 26, in its normal position, is shown in solid line, and when subjected to a twisting force, is shown in dashed line 26A. Single roller 36 contacts the undersurface of the track in either position. Rollers 38 and 40 are rotatably affixed to a pivoting roller support 25 which pivots in response to the twisting movement of track 26. The rollers 38 and 40 are shown in dashed lines 38A and 40A when track 26 is in its deflected position. Thus, instead of rigidly opposing the twisting force, this pivoting roller support readily adapts itself to this force and the twisting force is absorbed by the hinges outboard of the rollers and track.

Having thus described the principle of operation of the present invention, one such device is shown in FIGS. 6 and 7. Here there is shown the carriage support assembly 24 consisting of a back surface 74 adapted for mounting to fuselage support structure 76. Integral with the back surface 74 is a base portion 78 upon which is mounted a roller bracket 80 upon which is mounted the lower roller 36. Also integral with the back surface 74 is an upper base 82 from which depends a roller support bracket 84. Pivotally mounted to roller support bracket 84 is a roller support 25. This bracket is pivotally connected to bracket 84 at pivot point 86. This support has a front face 88 and a corresponding rear face 90 between which a pair of rollers 38 and 40 are rotatably mounted at points 92 and 94. These points are spaced an approximately equal distance from the roller support pivot point 86. Although not shown in FIGS. 6 and 7, pivot points 80 and 86 form a line that must pass through the hinge line 16 in FIG. 1. This insures that pivot points 92 and 94 are equal distance from the hinge line 16, also, until a twisting moment distorts them in a manner shown in FIG. 5. Track 26 consists of an arcuate member, rectangular in cross section, as shown in broken line 26 in FIG. 7. Mounted in the back surface 74 of the carriage support 24 are mounted rollers 94 to resist lateral inboard flap loads.

I claim:

1. A flap track and carriage support for movement of an airfoil on an aircraft comprising:
    a flap track affixed to said airfoil,
    a carriage affixed to said aircraft,
    a lower roller rotatably mounted on said carriage for engagement with the lower surface of said flap track,
    a roller support,
    a pair of rollers rotatably mounted on said support,
    said support being pivotally mounted on said carriage to permit engagement of said pair of rollers with the upper surface of said flap track during movement of said airfoil and track.

2. A flap track and carriage support as set forth in claim 1 wherein said airfoil is a flap pivotally mounted on an aircraft wing at points defining a hinge line,
    said flap track being affixed to said flap and having a radius of curvature extending from said hinge line.

3. A flap track and carriage support as set forth in claim 2,
    said flap track being affixed to the inboard end of said flap.
    said flap being hingedly connected to said wing in such manner that said flap moves along a conical surface relative to said hinge line.

4. A flap track and carriage support as set forth in claim 1,
    said carriage having a back surface for mounting to an aircraft fuselage, a lower base upon which said lower roller is mounted, and an upper base from which said roller support is pivotally mounted.

5. A flap track and carriage support as set forth in claim 4, and roller means on said back surface to bear lateral loads on said flap.

6. A flap track and carriage support as set forth in claim 1,
    said track having a predetermined path of movement between said lower roller and said rollers on said roller support,
    said roller support being pivotal in response to changes in said path of movement.

7. A flap track and carriage support as set forth in claim 2,
    said roller support being pivotal on said carriage along a first axis, said lower roller being rotatably mounted on said carriage along a second axis spaced from said first axis, said first axis, said second axis and said hinge line all lying in a common plane.

8. A flap track and carriage support as set forth in claim 7, said first and second axis and said hinge line being in parallel spaced relationship.

9. A flap track and carriage support set forth in claim 7, said rollers on said roller support being equidistant from said first axis.

References Cited

UNITED STATES PATENTS

| 3,101,678 | 8/1963 | Grube | 105—153 X |
| 3,276,394 | 10/1966 | Goirano | 105—153 |

FOREIGN PATENTS 712,028  7/1954  Great Britain.

FERGUS S. MIDDLETON, *Primary Examiner.*

R. A. DORNON, *Assistant Examiner.*

U.S. Cl. X.R.

16—87.6, 91; 49—41